April 18, 1933.   M. D. FITZGERALD   1,903,990
GASKET
Filed Oct. 28, 1932
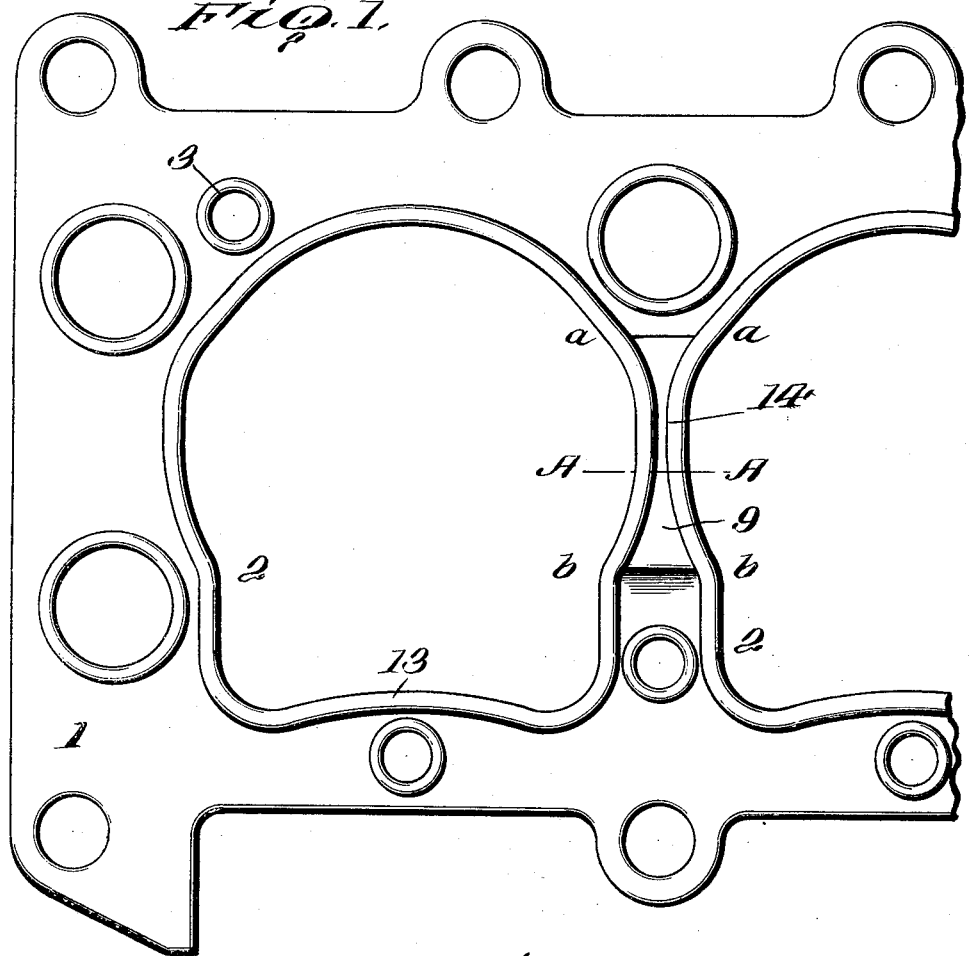
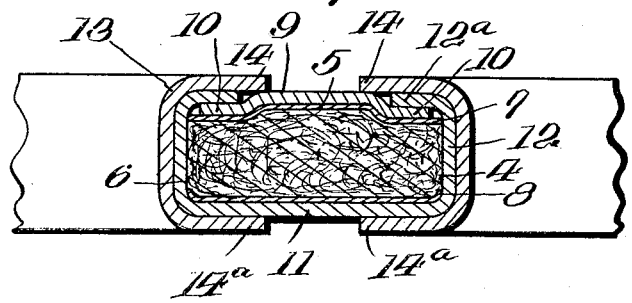
Inventor
Martin D. Fitzgerald Patented Apr. 18, 1933

1,903,990

UNITED STATES PATENT OFFICE

MARTIN D. FITZGERALD, OF TORRINGTON, CONNECTICUT, ASSIGNOR TO THE FITZ-GERALD MANUFACTURING COMPANY, OF TORRINGTON, CONNECTICUT, A CORPORATION OF CONNECTICUT

GASKET

Application filed October 28, 1932. Serial No. 640,095.

This invention relates to new and useful improvements in gaskets and more particularly to that type of gasket which is adapted to be placed between the cylinder head and the cylinder block of a multiple cylinder internal combustion engine.

In the construction of internal combustion engines having a plurality of cylinders, there is a relatively small space between the successive cylinder openings and for this reason it is of the utmost importance to provide a gasket which is strong enough to resist the extreme heat and pressure which results from the explosions within the several cylinders. Since the width of the gasket must coincide with the space between the cylinder openings, it follows that the gasket must be of sufficient strength to withstand the explosive forces particularly at these relatively narrow places. It is with a view toward providing such a gasket which will stand up under these conditions that the present invention is directed.

An object of the present invention is to provide a cylinder head gasket having the usual cylinder openings wherein a metallic ferrule or securing strip extends around the edges of the openings in the gasket and wherein the edge portions of the ferrule are turned over and down upon the upper and lower marginal faces of the gasket around the said openings whereby the component parts of the gasket are firmly held together and a tight joint is provided to withstand the heat and pressure.

A further object of the invention is to provide a gasket, of the type referred to, wherein a core or sheet of refractory material is disposed between two metallic facing members and wherein a metal sheathing member and an additional top facing insert are applied to the gasket in the region between the cylinder openings therein to reinforce and strengthen the gasket at these narrow portions.

A further object of the present invention is to provide a cylinder head gasket, of the type referred to, wherein the top facing insert is held under the turned over edge portions of the inserted sheathing member and wherein the securing ferrule, which extends around the cylinder openings in the gasket, serves to also hold the top insert and the sheathing member together.

The invention further aims to provide a cylinder head gasket for internal combustion engines which is inexpensive to manufacture and which is thoroughly capable of resisting the high temperatures and extreme pressure to which it is constantly subjected.

These and other objects of the invention will in part be obvious and will be hereinafter more fully described.

In the drawing:

Figure 1 is a plan view showing a portion of a cylinder head gasket embodying the improvements of the present invention.

Fig. 2 is an enlarged sectional view of the same taken along the line A—A of Fig. 1.

The present invention has particular reference to an improved gasket of the grommet or ferrule type. The gasket includes a sheet of refractory packing material disposed between two metallic covering plates. An additional top covering plate or insert is provided in the narrow region between successive cylinder openings to increase the strength at these places. In this region is also provided an inserted metallic sheathing member which extends across the bottom facing plate and has the edge portions thereof turned up and folded over the additional insert adjacent the openings. A metallic securing ferrule extends around the edge of each cylinder opening in the gasket and the edge portions thereof are turned back upon the top and bottom faces of the gasket whereby the component parts of the gasket, including the reinforcing inserts, are firmly held together and a tight joint is formed to prevent leakage.

Referring more in detail to the accompanying drawing, the gasket comprises a body portion 1 having the usual cylinder openings 2 and other openings 3 to permit the passage of the cooling medium through the cylinder block and to permit the insertion of suitable securing bolts. The body portion 1 includes a core 4 of asbestos or other heat resisting material disposed between a top covering plate 5, and a bottom covering plate 6. The top covering plate 5 has depressed or offset marginal portions 7. The edges of the bottom covering plate 6 are turned upwardly as at 8, and are embedded in the core 4 as shown in Fig. 1 of the drawing. An additional top insert 9 of suitable metal is placed over the top covering plate 5 and is also provided with offset portions 10 which register with the corresponding offset portions 7 of the plate 5. The top insert 9 is preferably applied only in the narrow region between the cylinder openings and extends from lines a—a to b—b as shown in the drawing. A sheathing or reinforcing member 11 is also applied in this region between the cylinder openings to strengthen the gasket. The reinforcing member 11 extends across the bottom facing member 6 and is bent upwardly, as at 12, to lie adjacent the sides of the core 4 of refractory material and then the edges 12a of the reinforcing member are bent over the top insert 9 and are pressed down and adapted to fit in the depressed portions 10 thereof. The metal sheathing member may, of course, be used throughout the gasket but is preferably used only in the narrow regions between the cylinder openings as shown between the dotted lines a—a and b—b in Fig. 1 of the drawing.

In order to securely hold the several parts of the gasket together, a metallic securing member or ferrule 13 extends around the edge of each of the cylinder openings in the gasket. The upper and lower edge portions 14, 14a of the ferrule are bent upon the body portion 1 of the gasket so that the parts are firmly secured together. As shown in Fig. 2, the ferrule provides an additional thickness at the narrow portion of the gasket between the cylinder openings and thus strengthens the gasket at this vital point. The turned over edge portions 14, 14a enclose the metal sheathing member 11 and aid in fastening the same. The top edge portions 14 rest partly on the sheathing member 11 and partly on the top insert 9 so that the pressure incident to the fastening of the cylinder head to the cylinder block, will be directed to both the top insert and the sheathing member whereby the component parts of the gasket are effectually and uniformly sealed together. The top and bottom facing members are preferably made of copper or other suitable metal as are the sheathing and top insert members.

It will be apparent from the foregoing description that, in the narrow portions between the cylinder openings of the gasket, a reinforcing unit comprising the metal sheathing 11 and the top insert 9 is provided. The thickness of the sheathing 11, top insert 9 and ferrule 13 is slightly greater than that of the top and bottom facing plates 5, 6 respectively. It is to be noted, also, that the securing ferrule affords an additional protective layer at the narrow portions of the gasket together with the sheathing member 13. Thus, the present invention provides a cylinder head gasket of the grommet or ferrule type wherein reinforcing members are inserted at the relatively weak portions thereof to prevent leakage or damage thereto.

It is, of course, obvious that minor details of construction may be made without departing from the scope of the invention.

Having thus fully described my invention, what I claim as new and desire to secure by Letters Patent, is:—

1. A gasket for internal combustion engines comprising a sheet of refractory material having a plurality of cylinder openings therein, top and bottom facing members between which said refractory material is disposed, a reinforcing unit applied to the gasket between the cylinder openings therein, said reinforcing unit including a top insert adapted to rest on the top facing member and a sheathing member extending under the bottom facing member and having the edge portions thereof bent upwardly and turned over the marginal face of the top insert, and a securing ferrule extending around the edge of each of said openings and having the edge portions thereof turned upon the top and bottom faces of the gasket whereby to secure the several parts together.

2. A gasket for internal combustion engines comprising a sheet of refractory material having a plurality of cylinder openings therein, top and bottom facing members between which said sheet of refractory material is disposed, said top facing member having marginal offset portions, a reinforcing unit applied to the gasket between the cylinder openings therein including a top insert having marginal off-set portions to register with said top facing member and a sheathing member extending under the bottom facing member and having the edge portions thereof bent upwardly and then turned over to lie in the marginal offset portions of said top insert, and a securing ferrule extending around the edge of each of said openings and having the edge portions thereof turned upon the top and bottom faces of the gasket whereby to secure the reinforcing unit and body portion of the gasket together.

3. A gasket for internal combustion engines comprising a body portion having a plurality of cylinder openings therein and including a sheet of refractory material disposed between top and bottom facing members, a reinforcing unit completely enclosing the body portion of the gasket in the narrow region between the cylinder openings, and a securing ferrule extending around the edge of each of said openings and having the edge portions thereof turned upon the top and bottom faces of the gasket whereby to secure the body portion and reinforcing unit together.

In testimony whereof, I affix my signature.

MARTIN D. FITZGERALD.